(12) United States Patent
Volkmer et al.

(10) Patent No.: US 11,642,935 B2
(45) Date of Patent: May 9, 2023

(54) HEAT EXCHANGE MODULE FOR AN ENERGY STORAGE MODULE, AND A PRODUCTION METHOD FOR SUCH A HEAT EXCHANGE MODULE

(71) Applicant: Dr. Ing. h.c. F. Porsche Aktiengesellschaft, Stuttgart (DE)

(72) Inventors: Christopher Volkmer, Niefern-Öschelbronn (DE); Dieter Schiebel, Korntal-Münchingen (DE); Sascha Mostofi, Zeltingen (DE); Thomas Neuhauser, Stuttgart (DE); Immanuel Vogel, Kornwestheim (DE); Philipp Kellner, Rennigen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/381,526

(22) Filed: Jul. 21, 2021

(65) Prior Publication Data
US 2022/0024278 A1 Jan. 27, 2022

(30) Foreign Application Priority Data
Jul. 22, 2020 (DE) ...................... 10 2020 119 288.6

(51) Int. Cl.
*F28D 7/00* (2006.01)
*B60H 1/00* (2006.01)

(52) U.S. Cl.
CPC ..... *B60H 1/00328* (2013.01); *B60H 1/00278* (2013.01)

(58) Field of Classification Search
CPC ..................... B60H 1/00328; B60H 1/00278
(Continued)

(56) References Cited

U.S. PATENT DOCUMENTS 7,258,161 B2 * 8/2007 Cosley .................. H01L 23/473
257/E23.098
11,171,372 B2 11/2021 Pucher et al.

FOREIGN PATENT DOCUMENTS

CN 107732355 A 2/2018
CN 209804846 U 12/2019
(Continued)

OTHER PUBLICATIONS

Great Britain Combined Search and Examination Report for Great Britain Application No. GB2110482.3, dated Nov. 17, 2021, 2 pages.
(Continued)

*Primary Examiner* — Davis D Hwu
(74) *Attorney, Agent, or Firm* — RatnerPrestia (57) ABSTRACT

A heat exchange module for an energy storage module, having a module housing for heat-transferring contact with an energy storage module; at least one operating medium channel for an operating fluid for heat transport; and at least one fluid connection for at least one external line for the operating fluid of the operating medium channel. There is formed by the at least one operating medium channel at least one receiving opening with a predetermined cross section in a channelward extension of the operating medium channel, in which a plug with a shape filling the predetermined cross section of the receiving opening is received such that the receiving opening is bonded thereto in a fluid-tight manner. With the heat exchange module, efficient use is made of a structural space, while the heat exchange module at the same time is able to be manufactured at low cost.

17 Claims, 3 Drawing Sheets

(58) Field of Classification Search
USPC .......................................................... 165/80.4
See application file for complete search history.

(56) References Cited

FOREIGN PATENT DOCUMENTS

| | | |
|---|---|---|
| CN | 111435762 A | 7/2020 |
| DE | 102017202354 A1 | 8/2018 |
| DE | 102018124053 A1 | 4/2020 |
| JP | 2020113446 A | 7/2020 |
| WO | 2019198952 A1 | 10/2019 |

OTHER PUBLICATIONS

Wikipedia, "Friction Welding", downloaded from the internet Jul. 8, 2019, https://en.wikipedia.org/wiki/Friction_welding, German with English Translation, 13 pages.

Japanese Notice of Reasons for Refusal for Japanese Application No. 2021-114845, dated Aug. 3, 2022, with translation, 7 pages.

\* cited by examiner

HEAT EXCHANGE MODULE FOR AN ENERGY STORAGE MODULE, AND A PRODUCTION METHOD FOR SUCH A HEAT EXCHANGE MODULE

CROSS-REFERENCE TO RELATED APPLICATION

This application claims priority to German Patent Application No.: 10 2020 119 288.6, filed Jul. 22, 2020, the content of such application being incorporated by reference herein in its entirety.

FIELD OF THE INVENTION

The invention relates to a heat exchange module for an energy storage module, and to a production method for such a heat exchange module.

BACKGROUND OF THE INVENTION

Energy storage modules in fully electrically or partially electrically operated motor vehicles are cooled by liquid cooling according to the prior art. For low-cost realization, it is an idea to produce a corresponding battery module housing by means of extrusion. In this case, the cooling channels for the liquid cooling can be integrated into the extrusion profile of the battery module housing in the form of chambers. For good packing density (high degree of space utilization efficiency), cooling channels with a non-round cross section are advantageous.

According to the prior art, for sealing off such non-round cross sections, use is made of axially compressed molded seals. In the case of extrusion-integrated cooling channels, this leads to an increased structural space requirement in the extrusion direction, because such a (wedge-shaped) molded seal has to project outward in the extension of the channel to achieve a reliable sealing action. It is desirable to make efficient use of the structural space, wherein even a few millimeters can amount to a significant competitive advantage.

SUMMARY OF THE INVENTION

Taking this as a starting point, it would be desirable to at least partially overcome the disadvantages known from the prior art. The features of the claims may be combined in any technically meaningful manner, it also being possible to use for this purpose the explanations from the following description and features from the figures, which cover additional configurations of the invention.

The invention relates to a heat exchange module for an energy storage module, having at least the following components:
a module housing for heat-transferring contact with an energy storage module;
at least one operating medium channel for an operating fluid for heat transport; and
at least one fluid connection for at least one external line for the operating fluid of the operating medium channel.

The heat exchange module is characterized in particular in that there is formed by the at least one operating medium channel at least one receiving opening with a predetermined cross section in a channelward extension of the operating medium channel, in which a plug with a shape filling the predetermined cross section of the receiving opening is received such that the receiving opening is bonded thereto in a fluid-tight manner.

Reference is made below to the axis of rotation mentioned if, without explicitly different information, the axial direction, radial direction or the circumferential direction and corresponding expressions are used. Ordinal numbers used in the description above and below, where not explicitly indicated to the contrary, serve merely for clear distinction and do not reflect any order or priority of the designated components. An ordinal number greater than one does not require that the presence of a further such component is absolutely necessary.

The heat exchange module proposed here is configured for cooling (or possibly heating) an energy storage module, for example of a vehicle battery (for example a so-called traction battery of an electrified drive train of a motor vehicle), so as to be able to operate the energy storage module in an optimum temperature range and/or to prevent or to delay known dendrite formation for a lithium-based electrical accumulator. The module housing has for this purpose the closest possible contact with the energy storage module and comprises a material with the best possible thermal conductivity. Furthermore, under some circumstances, a self-supporting structure and/or devices for crash safety are provided.

The at least one operating medium channel can be flowed through for conducting an operating fluid, preferably a liquid or alternatively a refrigerant or gas, wherein good heat transport between the operating fluid and the module housing is sought. Where reference is made here to a fluid-tight bond, then this relates to the operating fluid used. In the case of for example a (constantly) liquid operating fluid, for which the gas fractions are negligible, a liquid-tight bond is sufficient under some circumstances. In one embodiment, a meandering channel course is formed, wherein the channel portions are arranged so as to be mutually parallel, for example in an extrusion direction in the case of an extruded heat exchange module, and in each case form a channel bend at the face side. It is not necessary for the channel sections to be fluid-tight with respect to one another. It is rather the case that leaks between the individual channel sections are permissible.

The at least one fluid connection is configured for introduction and/or discharge of the operating fluid, for which purpose an external line, for example a constituent part of a cooling circuit in a motor vehicle, can be connected and is connected in an assembled state in a motor vehicle. In one embodiment, the external line can be pressed into the fluid connection. In one embodiment, the external line is already connected to the fluid connection before the assembly, for example formed in one piece therewith. In one embodiment, a heat exchange module comprises two fluid connections, specifically an inlet and an outlet, wherein the entire operating medium channel extends as a functional group between the inlet and the outlet. In another embodiment, a plurality of such functional groups is provided in the heat exchange module.

Here, it is now proposed that a receiving opening for a plug is formed in a channelward extension of the operating medium channel (or of a channel section). The plug is formed with a corresponding shape, such that the plug completely fills the predetermined cross section of said receiving opening. It should be pointed out here that, in a preferred embodiment, the plug is received with play in the receiving opening. In one embodiment, said play is eliminated after the assembly in a subsequent step, with the result that the bond between the plug and the receiving opening is then fluid-tight. In one embodiment, the plug is wedge-shaped in the channelward direction at least on the introduction side (that is to say toward the operating medium channel), wherein the plug is received over its entire length in the receiving opening. The plug is received in a fluid-tight manner in the receiving opening if for example the plug is in a state of full areal abutment or peripheral abutment, or is received without play or with a relative oversize, wherein the respective contact surface is formed in a sealing manner.

In a preferred embodiment, the (predetermined) cross section of the receiving opening is identical to the cross section of the operating medium channel or of the respective channel section. That is to say, there is no narrowing or widening or no local projection or recess. For example, the receiving opening is produced during extrusion of the heat exchange module, wherein a respective heat exchange module is a cut-off portion of the strand which is produced during the extrusion. The at least one operating medium channel and the receiving opening therefore do not differ from one another, except that the receiving opening is arranged at a face side after the respective heat exchange module has been cut off. In this embodiment, an arrangement in the channelward extension is the direction along the axis of manufacture (that is intrinsic according to the extrusion).

More generally, the channelward extension forms an axis which is defined by the course of the through-flowable portion of the operating medium channel. For example, the channelward extension is a course of the operating medium channel that is extrapolated into the receiving opening. For example, the channelward extension is a normal to the predetermined cross section of the operating medium channel at the transition to the receiving opening. In terms of its length extent, the receiving opening is determined by the length of the plug or the installation length thereof (which is dependent on the assembly principle and/or sealing principle). The receiving opening and the through-flowable operating medium channel preferably transition directly into one another without a further intermediate element and/or without a change in cross section.

In a preferred embodiment, at least one plug is provided at each channelward face side of the heat exchange module. This is particularly advantageous for a manufacture of the heat exchange module by means of extrusion.

A cooling connection interface for the cooling system of an energy storage module, for example of a vehicle battery, is thus formed. What is proposed is a module housing, which is for example extruded, with operating medium channels, at least one of which is non-round in cross section, integrated into hollow chambers, and with a cooling circuit which is positioned outside the energy storage module. The extruded module housing is machined in such a way that, in the (channelward) end region, the operating medium channel has a receiving opening in which a plug is arranged. Said plug is bonded in a water-tight manner to the module housing by means of at least one joining method and preferably has a round hole which forms the fluid connection. Via said fluid connection, a media-guiding coolant connection of an external line can be connected, and is connected during operation, in a water-tight manner.

In a preferred configuration, the receiving opening is arranged in the module housing in such a way that the receiving opening does not project beyond the remaining extent of the module housing. Thus, with its extent in the channelward extension of the operating medium channel, the receiving opening is arranged within the module housing. With the receiving opening, the result is a uniform, preferably planar, face surface of the module housing. Consequently, in this preferred embodiment, the receiving opening is not a component which lengthens the extent of the module housing channelward, for example in the direction of the extrusion axis. For example, the module housing produced by means of extrusion is separated in a planar manner, preferably with a cut surface with respect to which the extrusion axis has a normal orientation. Said cut surface is then the face surface. The extent of the receiving opening in the channelward extension of the operating medium channel extends inward with respect to the channel in relation to the direction of the extrusion axis.

In one embodiment, the module housing is machined by means of milling.

It is furthermore proposed in an advantageous embodiment of the heat exchange module that the plug comprises the fluid connection.

In this particularly advantageous embodiment, the fluid connection is formed directly by or in the plug, with the result that, for the fluid connection, no additional opening to be sealed off has to be formed in the heat exchange module. In one embodiment, the line-side connection piece and the region of the fluid connection, preferably the entire plug, are formed from a material pairing, which can be carried out sealingly in a form-fitting manner.

Consequently, there is no need for an additional step for sealing. In one embodiment, the fluid connection is already formed before the introduction of the plug in the receiving opening of the heat exchange module, and in another embodiment, said fluid connection is formed only after the introduction of the plug. Preferably, the fluid connection has (irrespective of the location of the introduction in the heat exchange module) a (narrowest) flow cross section which is significantly smaller than the (narrowest) flow cross section of the operating medium channel. The result of this is a throttling effect which brings about an improved flow distribution in terms of uniformity and thus promotes an efficient exchange of heat. The hole in the plug for forming the fluid connection is formed in a varied manner in terms of its diameter according to a desired throttling of the cooling medium.

It is furthermore proposed in an advantageous embodiment of the heat exchange module that the outer wall of a channel bend is formed by the plug.

In this embodiment, a channel bend is formed, in the case of channel sections of the operating medium channel that meander (for example parallel to one another), in each case at the face side at the plug. According to this embodiment, the plug simultaneously forms the outer wall of the channel bend, that is to say the wall section which is arranged at the face side of the heat exchange module. A channel-separating web, by means of which two (for example parallel) channel sections are separated fluidically from one another, is formed so as to be set back away from the plug channelward in the region of a channel bend such that, preferably, for as low a flow resistance as possible, a narrowest cross section of the channel bend is configured to be not smaller than the remaining cross section of the operating medium channel. In one embodiment, there are provided a smaller number of plugs than there are channel sections which are incident at a face side, for example just one plug at one end of the heat exchange module, wherein one plug closes off a plurality of channel sections in a fluid-tight manner channelward. In one embodiment or at a corresponding position of the operating medium channel, the plug is arranged in an edge-to-edge manner with respect to a channel-separating web, wherein, in one embodiment, play is provided, with the result that, due to the component tolerance and/or due to the assembly, a leak may be present between these adjacent channel sections. In one embodiment or at a corresponding position of the operating medium channel, the plug is spaced apart considerably from the channel-separating web, such that, there, a channel bend with as low a flow resistance as possible is formed.

One or more of the plugs are then formed without a hole and configured for diverting the cooling medium from a channel section into an adjacent channel section.

It is furthermore proposed in an advantageous embodiment of the heat exchange module that the plug is bonded in a fluid-tight manner to the receiving opening by means of at least one of the following material bonding methods:

friction stir welding;
laser welding;
gas-shielded welding; and/or
adhesion.

By means of friction stir welding, it is possible to realize reliably fluid-tight welding for a multiplicity of contact surfaces by simple means reliable and over in a very large thermal region of influence of a friction stir pin. This is a low-cost method which, due to the large thermal region of influence and the boundary surfaces consequently melting therein, does not necessitate great expenditure in terms of checking that the contact surfaces have been successfully sealed off in a fluid-tight manner.

By means of laser welding, precise and relatively low-energy welding is realized. If the coordinates of the weld seam are travelled across reliably, the sealing which is realized is highly reliable. At the same time, an impairment with regard to the thermal input and thus to a possibly delicate microstructure of the heat exchange module is only very locally limited, specifically is realized only in the weld seam itself.

Gas-shielded welding is a very low-cost method, which can be carried out mechanically or by hand. Basically, it is also the case here that the thermal region of influence is limited, with the stated advantages and disadvantages of laser welding. In comparison with laser welding, the thermal region of influence is slightly larger, and, in comparison with the above-mentioned welding methods, susceptibility to leakage as a result of a welding error is increased.

During a welding process, multiple plugs can be joined to the module housing, and bonded thereto in a fluid-tight manner, in the same work step.

Adhesion can be carried out without any or with only negligible (impairing) thermal influence on the material and is very reliably fluid-tight with simple means under suitable process control. Possibly, durability is critical, for example under vibratory loads during mobile use in a motor vehicle and/or in a sought or maximum permissible temperature range.

It is furthermore proposed in an advantageous embodiment of the heat exchange module that the module housing comprises a receiving chamber for an energy storage module, which receiving chamber is adjacent to the operating medium channel.

In this embodiment, a receiving chamber for an energy storage module is already integrated, preferably in one piece, into the module housing of the heat exchange module. Consequently, it is possible to achieve a very small wall thickness between the at least one operating medium channel and the receiving chamber (or the energy storage module) and thus very low thermal resistivity. Consequently, in turn, it is possible to request high power peaks from the energy storage module because the heat caused thereby can be dissipated effectively and also very finely regulated temperature control is possible. With an effectively regulable temperature control, it is in turn the case that operating costs or the energy consumption for the cooling circuit can be reduced.

It is furthermore proposed in an advantageous embodiment of the heat exchange module that the module housing is terminated at the outer side by the plug in a manner flush with the receiving opening of the operating medium channel, or the plug is received in the receiving opening in a manner recessed inward with respect to the channel.

In this embodiment, particularly in relation to a flush termination of the plug with respect to the receiving opening of the operating medium channel, a high power density of the heat transport can be achieved within a very small structural space. In a preferred embodiment, the plug bonded by material bonding is, in comparison with a pressed-in plug, formed with a very small installation length (that covers the sealing surface). By way of a suitable bonding method, for example welding, it is possible with a very short width of the (peripheral) sealing surface for sufficient strength for the operating medium pressure in the operating medium channel and for a sufficiently fluid-tight bond to be generated.

According to a further aspect, a production method is proposed for a heat exchange module according to an embodiment according to the above description, which production method comprises at least the following steps:

a. providing the module housing and the at least one plug;
b. inserting the at least one plug into the corresponding receiving opening; and
c. bonding the plug in a fluid-tight manner to the receiving opening.

What is proposed here is a production method by means of which the heat exchange module in an embodiment according to the above description can be produced in a simple and low-cost manner. Firstly, in a step a., the module housing and the at least one plug, preferably at least one plug for each face side of the operating medium channel, are provided. In step b., the plug is inserted into the corresponding receiving opening, for example, formed with a small relative undersize, pushed therein along the channelward extension. Finally, the remaining gap is or the two corresponding contact surfaces are closed in a fluid-tight manner. Here, at the same time, the plug is, mechanically, fixed sufficiently in such a way that, with an operating medium pressure in the operating medium channel and under possibly occurring external loads (for example vibratory loads), the plug remains in the receiving opening, specifically in a fluid-tight manner in this case, over a sought service life.

It is furthermore proposed in an advantageous embodiment of the production method that, in a step d., the fluid connection is formed in the manner according to an embodiment according to the above description:

before step b., or
after step c.

In one embodiment, the fluid connection is already formed before the insertion of the plug into the receiving opening, that is to say before step b. This makes it possible to produce the plug in a very low-cost (separate) manner in advance of the production method described here.

In another embodiment, the fluid connection is formed, preferably in the plug, only after the fluid-tight bonding of the plug to the receiving opening. This allows a process control during the formation of the fluid-tight bond in which a shape and type of the fluid connection does not yet need to be taken into consideration. Very particularly, in the case of friction stir welding, which requires a very large thermal region of influence, a fluid connection formed in advance leads to a deformation of the fluid connection, and/or to a thermal influencing of the corresponding (peripheral) contact surfaces of the fluid-tight bond between the plug and the receiving opening to be produced that is difficult to set. The fluid connection is produced for example in a cutting manner, preferably by means of drilling.

The hole in the plug can be formed, according to a desired throttling of the cooling medium, in a varied manner in terms of its diameter, for example individually adaptable to existing tolerances of the flow resistances.

It is furthermore proposed in an advantageous embodiment of the production method that, before step b., in a step e., a channel bend in the module housing is prepared in that a channel-separating web is shortened at the inner side of the channel bend in the insertion direction of the corresponding plug.

In this embodiment, which is preferably used in the case of an extruded module housing, at the place where a channel bend is to be produced, the respective channel-separating web is shortened, for example milled, channelward in a step e. As soon as the plug, which terminates at least the respective two channel sections on both sides of the shortened channel-separating web at the face side, is inserted into the corresponding receiving opening, a channel bend is formed (after step b. or in a fluid-tight manner after step c.). Thus, the plug then forms the outer wall of the channel bend.

It is furthermore proposed in an advantageous embodiment of the production method that, before step b., in step f., the receiving opening is adapted to the plug.

In this embodiment, the receiving opening is still to be machined before the plug can be inserted in step b. In one embodiment, this step f. takes place even before step a., for example immediately after separation of the respective module housing from the extruded blank, which extruded blank comprises a plurality of module housings over an extrusion length. The channel inner surface of the operating medium channel is mechanically machined in the region of the face side of the extrusion profile according to tolerances of the extrusion profile. Such an adaptation comprises for example a change in the surface roughness, an introduction of a bevel which facilitates the assembly, a widening of the receiving opening in comparison with the through-flowable section of the operating medium channel, a formation of a stop or of a Poka-Yoke receptacle for the plug, a surface coating, surface treatment and/or a reduction in the relative tolerance. In one embodiment, cleaning is carried out before the joining of the plug and/or as a final step of the method, wherein chips, welding residues and/or oil residues and also other impurities are removed.

According to a further aspect, the invention proposes a motor vehicle having at least one electrical drive machine, which is connected in a torque-transmitting manner to propulsion wheels, and at least one energy storage module in a heat exchange module according to an embodiment according to the above description, wherein, for propulsion of the motor vehicle, the electrical drive machine can be supplied with a supply voltage by means of the energy storage module.

What is proposed here is a motor vehicle, for example a passenger motor vehicle, which, for its own propulsion, comprises at least one drive machine, for example an internal combustion engine and/or an electrical drive machine, and at least one propulsion wheel. The propulsion wheel is connected in a torque-transmitting manner to the at least one drive machine via a transmission and preferably via a differential. In this way, the motor vehicle can be propelled by means of the at least one drive machine. The power request of the at least one drive machine and, under some circumstances, of further consumers in the motor vehicle cause a generation of heat in the energy storage module, for example of a so-called traction battery in this case, which can be dissipated efficiently and using a very small structural space by means of the heat exchange module. In an alternative application, the heat exchange module is used in order (for example in winter) to heat the energy storage module to an optimum temperature, so that the usable power of the energy storage module is increased.

BRIEF DESCRIPTION OF THE DRAWINGS

The above-described invention will be discussed in detail below against the relevant technical background with reference to the associated drawings, which show preferred refinements.

The invention is not in any way restricted by the purely schematic drawings, and it should be noted that the drawings are not to scale and are not suitable for defining size ratios. In the drawings.

DETAILED DESCRIPTION OF THE INVENTION

Figure 1:
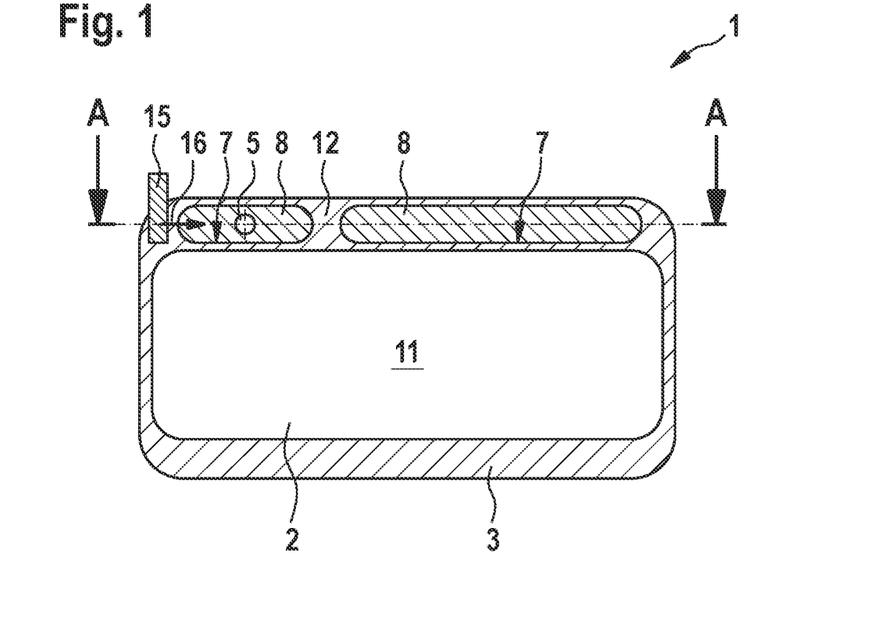
FIG. 1 shows a heat exchange module in a face-side plan view.

FIG. 1 shows a heat exchange module 1 in a front view, wherein the module housing 3 thereof is produced for example by means of extrusion. The module housing 3 comprises a receiving chamber 11 (optionally integrated in one piece in this case), which is configured for receiving an energy storage module 2. Above the receiving chamber 11 according to the illustration, there are formed receiving openings 7 in a channelward extension of the channel sections (cf. FIG. 2), in this case in the form of two elongate holes, which are produced for example by means of milling. The two receiving openings 7 are separated by means of a channel-separating web 12. The channel-separating web 12 is (optionally) formed here in one piece with the module housing 3. In the receiving openings 7, there are inserted in each case one plug 8 with a corresponding shape, such that the plug 8 completely fills the predetermined cross section of the receiving opening 7. Preferably, the plugs 8 are received with play in the in each case corresponding receiving opening 7. In order, then, to bond the plugs 8 to the receiving openings 7 and to terminate them in a fluid-tight manner, use is made in this embodiment of friction stir welding as material bonding method. For this purpose, a friction stir pin 15 travels in a friction stir direction 16, from left to right according to the illustration in this case, over the face side (arranged in the plane of the page) of the heat exchange module 1. The kinetic energy is converted into heat, and, at the boundary surfaces of the plugs 8 (and preferably of the receiving openings 7), the material is melted and a materially bonded and reliably fluid-tight bond between the inserted plug 8 and the receiving opening 7 is thereby produced. Furthermore, the plug 8 arranged on the left according to the illustration comprises a fluid connection 5 (optionally circular in this case), which is configured for introduction and/or discharge of the operating fluid and is connected to an external line 6 (cf. FIG. 2 and FIG. 3). Furthermore, a section plane A-A corresponding to the sectional view in FIG. 2 and FIG. 3, with FIG. 3 showing an alternative embodiment, is drawn here.

Figure 2:
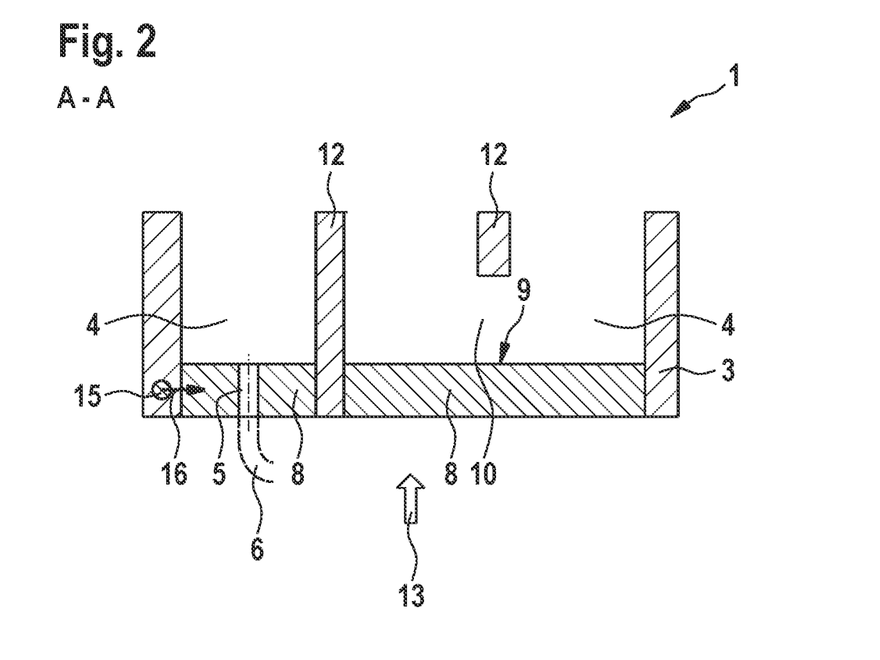
FIG. 2 shows a detail of the heat exchange module as per FIG. 1 in the sectional view A-A.

FIG. 2 shows a detail of the heat exchange module 1 as per FIG. 1 in the sectional view A-A. Here, it can be clearly seen that, above the left-hand plug 8 of the heat exchange module 1 according to the illustration, an operating medium channel 4 is formed and, above the right-hand plug 8 according to the illustration, the operating medium channel 4 forms a channel bend 10. In this embodiment, an operating medium channel 4 is formed with (in this case, schematically, three) channel sections arranged parallel to one another. Here, it can be seen that the receiving openings 7 are formed in the channelward extension, that is to say in this case in the extension of the orientation of the channel sections which is parallel to the channel-separating webs 12. For example, the fluid connection 5 is an inlet and, on the opposite face side (outside the detail shown) at the channel section on the far right according to the illustration, a further fluid connection is formed as an outlet for the operating fluid, or vice versa. In such an embodiment, the module housing 3 therefore comprises a single operating medium channel 4. Alternatively, a plurality of operating medium channels 4 with in each case one inlet and one outlet, that is to say two fluid connections 5, are formed. In the embodiment shown, the channel section on the far left and the middle channel section are separated fluidically from one another by means of a channel-separating web 12, and the middle channel section and the channel section on the far right are separated fluidically from one another by means of a further channel-separating web 12 (over the predetermined length, that is to say as far as a channel bend 10). The channel bend 10 shown in this detail between the middle channel section and the right-hand channel section is in this case formed so as to be set back (away from the plug 8), for example by means of milling of the right-hand channel-separating web 12. Here, the right-hand plug 8 according to the illustration simultaneously forms the outer wall 9 for the illustrated channel bend 10. For example, the cross sections of the receiving openings 7 formed in the channelward extension are identical to the cross sections of the respective channel section, wherein the right-hand plug 8 according to the illustration overlaps the corresponding channel-separating web 12 of the channel bend 10. A stepless transition between the channel section and the receiving opening 7 is advantageous for example in the case of the module housing 3 being manufactured by means of extrusion, wherein no reworking of the receiving openings 7 is necessary. Here, the plugs 8 are inserted into the receiving openings 7 of the module housing 3 in each case in an insertion direction 13 (from bottom to top according to the illustration). The insertion direction 13 is oriented channelward. Subsequently, the plugs 8, in the respective receiving opening 7, are bonded in a materially bonded and fluid-tight manner to the module housing 3 by means of friction stir welding. Here, a termination of the plugs 8 with respect to the module housing 3 that is flush channelward or with the face surface of the module housing 3 is (optionally) formed such that, in relation to a (predetermined) structural depth of the plug 8 in the (channelward) insertion direction 13, an overall structural length of the heat exchange module 1 is minimal with a long length of the operating medium channel 4. It should be pointed out at this juncture that the structural depth of the plugs 8 is significantly less than in conventional embodiments with connecting pieces pressed in (for example in the insertion direction 13). Furthermore, the fluid connection 5 in the left-hand plug 8 is shown here, this being connected here, preferably in a water-tight manner, to an external line 6. The fluid connection 5 is produced for example by means of subsequent drilling.

Figure 3:
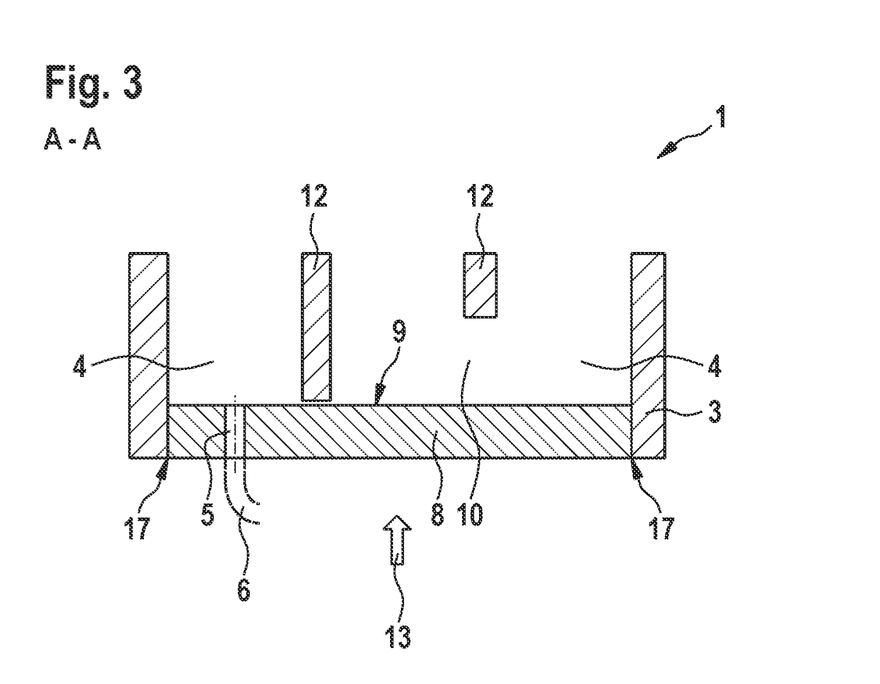
FIG. 3 shows a detail of the heat exchange module in an alternative embodiment in a view corresponding to section A-A in FIG. 1.

FIG. 3 shows a detail of a heat exchange module 1 in an alternative embodiment in a sectional view A-A as per FIG. 3. Below, the differences illustrated here are described and, furthermore, reference is made to the above description with regard to the embodiment as per FIG. 1 and FIG. 2. By contrast to FIG. 2, in the embodiment shown, only one receiving opening 7 is formed in the module housing 3. A single corresponding plug 8 is received therein. In this embodiment, play is (optionally) formed between the left-hand channel-separating web 12 according to the illustration and the (single) plug 8, with the result that, due to the component tolerance and/or the assembly tolerance, a leak may be present between the adjacent channel sections. The right-hand operating medium channel 4 according to the illustration is formed identically to that in FIG. 2, wherein here, the (single) plug 8 forms the outer wall 9 of the channel bend 10. Irrespective of the embodiment of the plug 8, said plug is (optionally) terminated here in a materially bonded and fluid-tight manner with respect to the receiving opening 7 by means of a laser weld seam 17.

Figure 4:
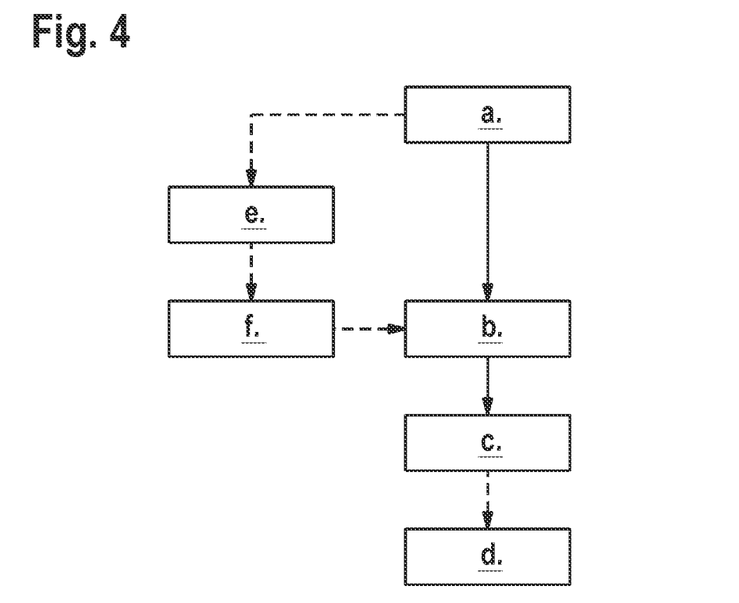
FIG. 4 shows a flow diagram of a production method for a heat exchange module.

FIG. 4 shows a flow diagram of a production method for a heat exchange module 1 with optional steps d., e. and f. For understanding the production method, reference is made to the embodiments as per FIG. 1 to FIG. 3. In a step a., the module housing 3 and at least one plug 8 are provided, and then, in a step b., the plug 8 is inserted into the corresponding receiving opening 7, for example by means of pushing-in in the insertion direction 13. Beforehand, (optionally) in a step e. the channel bend 10 in the module housing 3 is prepared in that a channel-separating web 12 is shortened at the inner side of the channel bend 10 in the insertion direction 13 of the corresponding plug 8, for example by means of milling. Furthermore, in an (optional) step f., the receiving opening 7 is adapted to the requirements of the plug 8 and/or of the bonding method in step c., that is to say the shape is changed and/or the surface is machined. In an embodiment in which the receiving opening 7 is to be reworked as per step f., the receiving opening 7 is preferably reworked simultaneously, in a milling process, with the formation of the channel bend 10, wherein possibly (in the case of an end milling cutter with a diameter which is constant over its penetration length) the channel sections are extended in the region of a channel bend 10. The step c. comprises the fluid-tight bonding of the plug 8 to the receiving opening 7, for example by means of laser welding or friction stir welding. (Optionally finally), in an (optional) step d., the fluid connection 5 is formed in the plug 8, for example by means of drilling.

Figure 5:
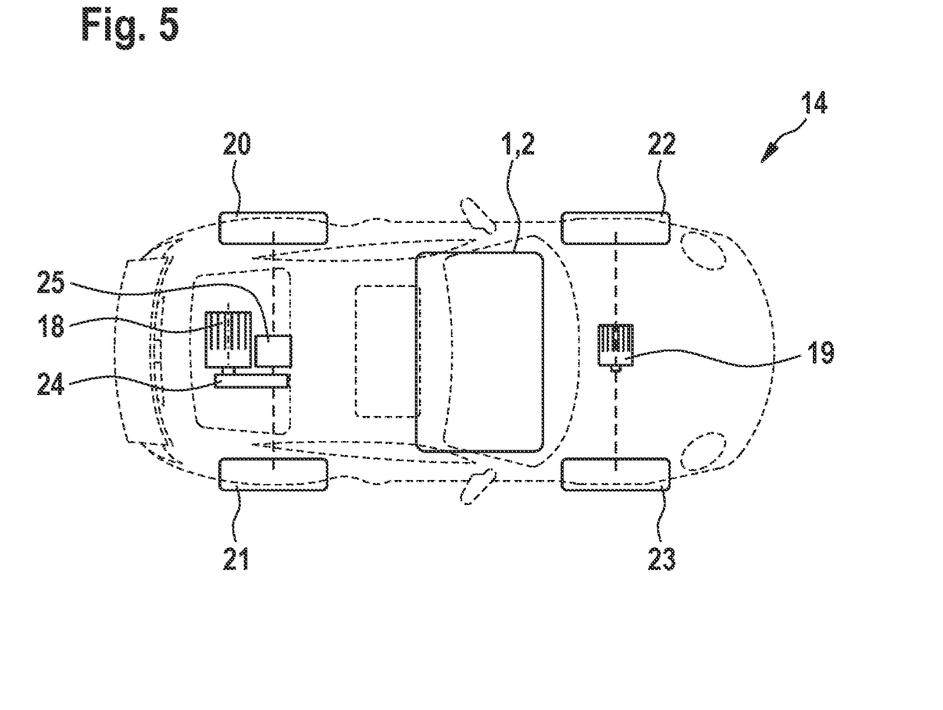
FIG. 5 shows a motor vehicle with a heat exchange module.

FIG. 5 shows a motor vehicle 14 in a schematic plan view. In the region of the rear end, there is (optionally) arranged an (optionally electrical) drive machine 18 which, for the propulsion of the motor vehicle 14, is connected via a transmission 24 and a differential 25 to a rear left propulsion wheel 20 and to a rear right propulsion wheel 21. In the region of the front of the motor vehicle 14, there are arranged, preferably in a steerable manner, a front left propulsion wheel 22 and a front right propulsion wheel 23 which (optionally additionally or alternatively), also for propulsion, are connected in a torque-transmitting manner to a second (optionally electrical) drive machine 19. Here, provision is then made (optionally between the rear propulsion wheels 20,21 and the front propulsion wheels 22,23) of a heat exchange module 1, for example according to an embodiment in FIG. 1 to FIG. 3, which comprises an energy storage module 2, preferably in the form of a traction battery for providing a supply to at least one of the drive machines 18,19.

With the heat exchange module proposed here, efficient use is made of a structural space, said heat exchange module at the same time being able to be manufactured at low cost.

What is claimed:

1. A heat exchange module for an energy storage module, said heat exchange module comprising:
    a unitary module housing configured to maintain heat-transferring contact with an energy storage module, the unitary module housing including module walls defining a module interior;
    at least one operating medium channel disposed between the walls of the unitary module housing and within the module interior for receiving an operating fluid for heat transport;
    at least one fluid connection for at least one external line for the operating fluid of the operating medium channel;
    at least one receiving opening formed by the at least one operating medium channel and having a predetermined cross section in a channelward extension of the operating medium channel, the at least one receiving opening residing within the module interior and being defined by the walls of unitary module housing; and
    a plug positioned in the at least one receiving opening that is defined by the module walls, and the plug having a shape that fills the predetermined cross section of the at least one receiving opening such that the receiving opening is bonded thereto in a fluid-tight manner.

2. The heat exchange module as claimed in claim 1, wherein the plug comprises said at least one fluid connection.

3. The heat exchange module as claimed in claim 1, wherein an outer wall of a channel bend is formed by the plug.

4. The heat exchange module as claimed in claim 1, wherein the plug is bonded in a fluid-tight manner to the receiving opening by at least one of the following material bonding methods: friction stir welding; laser welding; gas-shielded welding; and/or adhesion.

5. The heat exchange module as claimed in claim 1, wherein the module housing comprises a receiving chamber for an energy storage module, which receiving chamber is disposed adjacent to the operating medium channel.

6. The heat exchange module as claimed in claim 1, wherein the module housing is terminated at an outer side by the plug in a manner flush with the receiving opening of the operating medium channel, or the plug is received in the receiving channel in a manner recessed inward with respect to the channel.

7. In a heat exchange module for an energy storage module, said heat exchange module including (i) a unitary module housing configured to maintain heat-transferring contact with an energy storage module, the unitary module housing including module walls defining a module interior, (ii) at least one operating medium channel disposed between the walls of the unitary module housing and within the module interior for receiving an operating fluid for heat transport; (iii) at least one fluid connection for at least one external line for the operating fluid of the operating medium channel, (iv) at least one receiving opening formed by the at least one operating medium channel and having a predetermined cross section in a channelward extension of the operating medium channel, the at least one receiving opening residing within the module interior and being defined by the walls of unitary module housing, and (v) a plug positioned in the at least one receiving opening that is defined by the module walls, and the plug having a shape that fills the predetermined cross section of the at least one receiving opening such that the receiving opening is bonded thereto in a fluid-tight manner, a production method for the heat exchange module, said method comprising the following steps:
    a. providing the module housing and the at least one plug;
    b. inserting the at least one plug into the corresponding receiving opening; and
    c. bonding the plug in a fluid-tight manner to the receiving opening.

8. The production method as claimed in claim 7, wherein in a step d., the at least one fluid connection is formed either before step b., or after step c.

9. The production method as claimed in claim 7, wherein before step b., in a step e., a channel bend in the module housing is prepared in that a channel-separating web is shortened at an inner side of the channel bend in the insertion direction of the corresponding plug.

10. The production method as claimed in claim 7, wherein before step b., in step f., the receiving opening is adapted to the plug.

11. The heat exchange module as claimed in claim 1, wherein the plug is positioned between the module walls.

12. The heat exchange module as claimed in claim 1, wherein the plug is positioned entirely within the unitary housing.

13. The heat exchange module as claimed in claim 1, wherein the plug does not protrude outside of the unitary housing.

14. The heat exchange module as claimed in claim 1, further comprising another operating medium channel disposed between the walls of the unitary module housing and within the module interior, and another plug that is positioned within the receiving opening of said another operating medium channel.

15. The heat exchange module as claimed in claim 1, wherein one of the walls of the unitary module housing is positioned between the two walls forming the at least one operating medium channel, wherein said one of the walls is shortened relative to said two walls.

16. The heat exchange module as claimed in claim 15, wherein the plug abuts against said one of the walls.

17. The heat exchange module as claimed in claim 15, wherein an intermediate fluid channel is formed between the plug and said one of the walls.

* * * * *